(12) United States Patent
Liu et al.

(10) Patent No.: US 12,205,397 B2
(45) Date of Patent: Jan. 21, 2025

(54) METHOD OF HUMAN POSE ESTIMATION

(71) Applicant: Black Sesame International Holding Limited, San Jose, CA (US)

(72) Inventors: Xiaomin Liu, Sunnyvale, CA (US); Lei Zhang, Campbell, CA (US); Qun Gu, San Jose, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 352 days.

(21) Appl. No.: 17/463,166

(22) Filed: Aug. 31, 2021

(65) Prior Publication Data

US 2023/0067442 A1 Mar. 2, 2023

(51) Int. Cl.
*G06V 40/10* (2022.01)
*G06T 7/73* (2017.01)
*G06V 10/50* (2022.01)

(52) U.S. Cl.
CPC .............. *G06V 40/103* (2022.01); *G06T 7/73* (2017.01); *G06V 10/50* (2022.01)

(58) Field of Classification Search
CPC .... G06V 40/103; G06V 10/50; G06V 10/143; G06V 10/82; G06V 40/10; G06V 10/774; G06V 20/41; G06V 20/46; G06T 7/73; G06T 2207/10016; G06T 2207/20084; G06T 2207/30196; G06N 3/08
USPC ......................................................... 382/103
See application file for complete search history.

(56) References Cited

U.S. PATENT DOCUMENTS

| | | | | |
|---|---|---|---|---|
| 9,418,475 | B2* | 8/2016 | Medioni | G06T 17/00 |
| 11,036,989 | B1* | 6/2021 | Assouline | A63F 13/213 |
| 11,062,476 | B1* | 7/2021 | Bigontina | G06V 10/454 |
| 11,074,711 | B1* | 7/2021 | Akbas | G06V 10/454 |
| 2019/0130578 | A1* | 5/2019 | Gulsun | G06N 3/045 |
| 2020/0202119 | A1* | 6/2020 | Wang | G06V 40/20 |
| 2021/0390710 | A1* | 12/2021 | Zhang | G06V 10/82 |

FOREIGN PATENT DOCUMENTS

| | | | | |
|---|---|---|---|---|
| CN | 110705457 | * | 9/2019 | G06V 20/176 |
| CN | 111881914 | * | 11/2020 | G06V 30/153 |
| CN | 112347888 | * | 2/2021 | G06V 20/13 |
| CN | 113361380 | * | 9/2021 | G06F 18/214 |

* cited by examiner

*Primary Examiner* — Jerome Grant, II
(74) *Attorney, Agent, or Firm* — Timothy T. Wang; Ni, Wang & Massand, PLLC (57) ABSTRACT

A method of human pose estimation, including, receiving an image frame, extracting in at least a first stage a first stage image feature based on the image frame, extracting in at least a second stage a second stage image feature based on the first stage image feature, extracting in at least a subsequent stage a subsequent stage image feature based on the second stage image feature, up-sampling the subsequent stage image feature, up-sampling the second stage image feature, concatenating the first stage image feature, the up-sampled second stage image feature and the up-sampled subsequent stage image feature and outputting a feature map based on an output of the concatenation.

21 Claims, 10 Drawing Sheets

Fig. 10

METHOD OF HUMAN POSE ESTIMATION

BACKGROUND

Technical Field

The instant disclosure is related to pose estimation more specifically to human pose estimation.

Background

Human pose estimation detects a set of key points representing the joints or body parts in images and videos. The joints or body parts are connected in a pre-defined format to describe the pose of the person. Pose estimation has various applications in motion detection and recognition, pedestrian tracking, augmented reality and animation etc. It provides information towards understanding people's orientation, action, behavior and activity and the like. Accurate pose estimation may pose a challenge due to the large variation of human visual appearance, scales, body movement, and partial occlusions. Multi-person pose estimation requires simultaneous detection of multiple people in an image thus further complicating the estimation. Currently, human pose estimation is not accessible for multiple human pose estimations on resource limited equipment.

SUMMARY

An example method of human pose estimation, including, receiving an image frame, extracting in at least a first stage a first stage image feature based on the image frame, extracting in at least a second stage a second stage image feature based on the first stage image feature, extracting in at least a subsequent stage a subsequent stage image feature based on the second stage image feature, up-sampling the subsequent stage image feature, up-sampling the second stage image feature, concatenating the first stage image feature, the up-sampled second stage image feature and the up-sampled subsequent stage image feature and outputting a feature map based on an output of the concatenation.

Another example method of human pose estimation, including, receiving a feature map by an initial stage, convoluting the feature map based on an initial part affinity map branch of the initial stage, determining an initial part affinity map based on an output of the initial part affinity map branch, convoluting the feature map based on an initial heat map branch of the initial stage, determining an initial heat map based on an output of the initial heat map branch, concatenating the initial part affinity map branch, the initial heat map branch and the feature map to output an initial stage concatenation, receiving the initial stage concatenation by a refinement stage, convoluting the initial stage concatenation via refinement part affinity map branch of the refinement stage, determining a refinement part affinity map based on an output of the refinement part affinity map branch, convoluting the initial stage concatenation via refinement heat map branch of the refinement stage and determining a refinement heat map based on an output of the refinement heat map branch.

Yet another example method of human pose estimation, including, receiving a feature map by an initial stage, convoluting the feature map based on a first part affinity map branch of the initial stage, determining a first stage part affinity map based on an output of the first part affinity map branch, concatenating the first stage part affinity map branch and the feature map to output a first stage part affinity map concatenation, convoluting the first stage part affinity map concatenation to output a second stage part affinity map convolution, determining second stage part affinity map based on an output of the second stage part affinity map convolution, concatenating the second stage part affinity map branch and the feature map to output a second stage part affinity map concatenation, receiving the second stage part affinity map concatenation by a refinement stage, convoluting the second stage part affinity map concatenation to output a third stage part affinity map convolution, determining a third stage part affinity map based on an output of the third stage part affinity map convolution, concatenating the third stage part affinity map and the feature map to output a concatenated third stage part affinity map, convoluting the concatenated third stage part affinity map to output a refinement heatmap prediction and determining a refinement heat map based on an output of refinement heatmap prediction stage.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope of the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
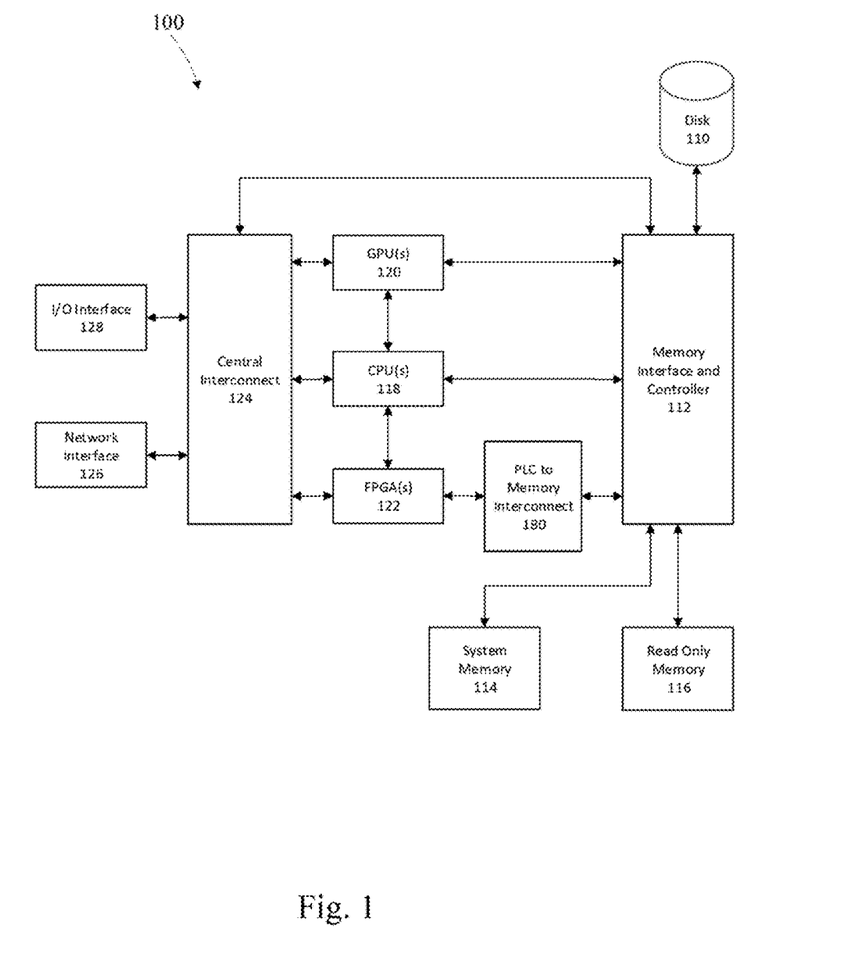
FIG. 1 is a first example system diagram in accordance with one embodiment of the disclosure.

FIG. 1 depicts an example hybrid computational system 100 that may be used to implement neural nets associated with the operation of one or more portions or steps of the processes. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
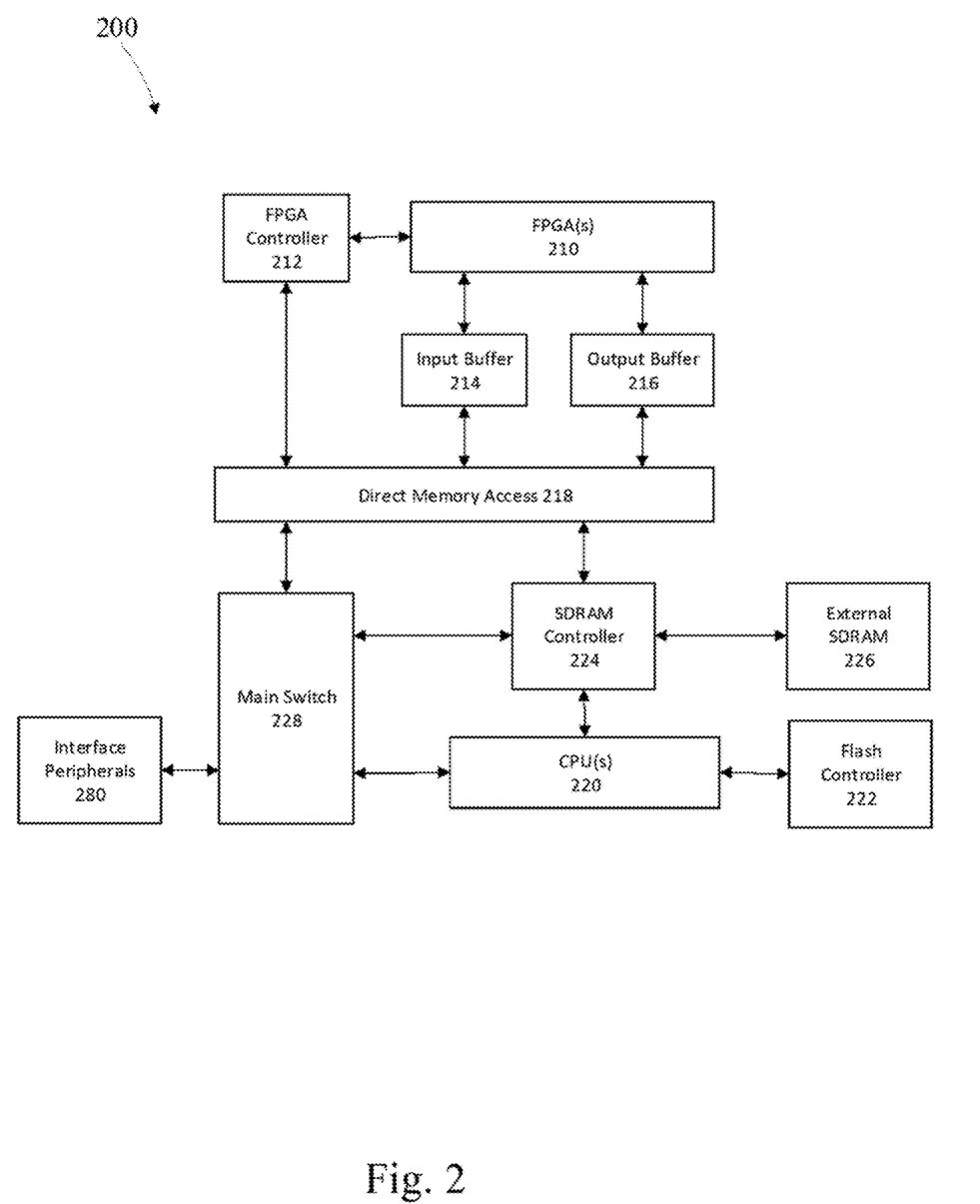
FIG. 2 is a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

Current multi-person pose estimation methods can be divided into two categories: top-down or bottom-up methods. Top-down methods rely on object detectors to detect humans and the run time increases in proportion to the number of humans in the images, thus making it impractical for real-time usage in a crowded scene. Bottom-up methods detect body parts and group them together to form individual humans, allowing the run time to be largely invariant with respect to the number of people in the images. Current bottom-up methods utilize a resource heavy model, which does not allow them to be deployed on resource limited embedded systems to achieve real-time performance.

The proposed solution utilizes a bottom-up method that includes a nonparametric representation called Part Affinity Fields (PAFs) to associate body parts with individuals in the image and body part locations also called heat maps. The association of part affinity fields and heat maps provide two branches of a sequential prediction process.

The proposed solution is a two-dimensional multi-person human pose estimation method that estimates two dimensional human poses from color or infrared input images. The bottom-up framework for multi-person pose estimation jointly learns body part locations and their association with individuals. The base model has a reduced size, fusion of multi-level feature maps and reduced number of stages to make the model usable on resource limited products. The proposed solution may utilize a model for embedded systems that has resources reduced by 80% over current models while achieving similar real-time performance.

The proposed two dimensional multi-person human pose estimation method estimates two-dimensional human poses utilizing an image frame from a monocular camera, such as a red-blue-green (RGB) camera or infrared (IR) camera based systems. The bottom-up framework for multi-person pose estimation jointly learns part locations and their association. The image frame may be a single frame as that output from a camera or at least one image frame from a video camera.

A residual neural network (ResNet) is a model that utilizes pyramidal cells in a cerebral cortex utilizing skip connections to jump over some layers. One example system utilizes a ResNet-v1-50 to extract image features from an image frame, which is much more lightweight than other models utilized for bottom-up determination methods. The addition of residual connections may allow ResNet to achieve representational ability with a deeper and more lightweight network structure. The output of ResNet for classification task is down-sampled by 32, which is more suitable for image classification tasks. A down-sampled, coarse feature map may not include enough details for accurate localization of body parts, therefore various permutations were examined.

Figure 3:
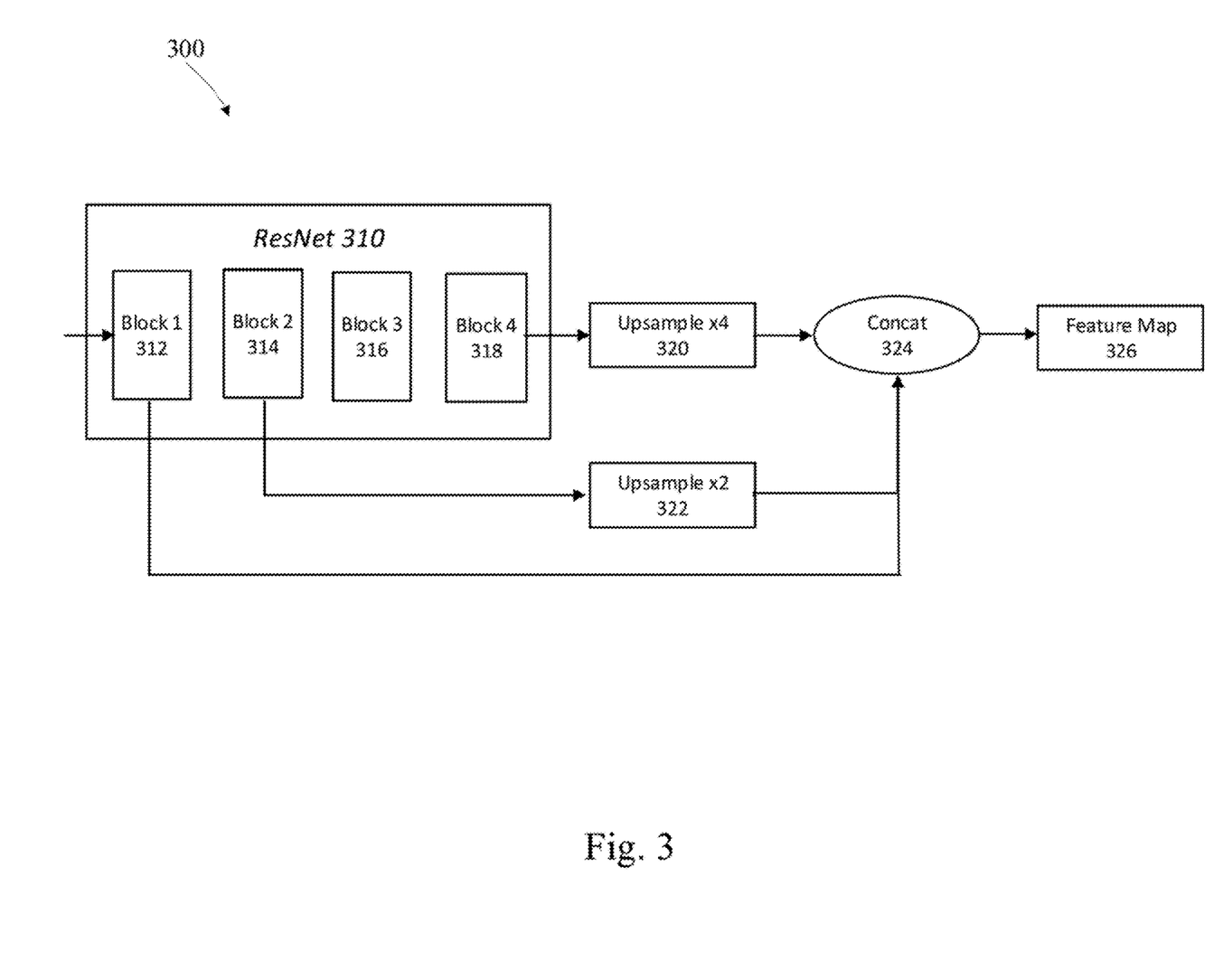
FIG. 3 is an example structure in accordance with one embodiment of the disclosure.

One example model included combining the output from different layers that contains both low-level spatial details and high-level semantic data. This example is illustrated in FIG. 3, the output of block 1, the output of block 2 up-sampled by 2 times and the output of block 4 up-sampled by 4 times may be concatenated together as the feature map. Experimental results indicated that this example model had the ability to fuse pyramid features from multiple scales rather than simply utilizing up-sampled or dilated convolutional features at the end of the model.

FIG. 3 depicts the first example model that includes a ResNet engine 310. This example has a ResNet-v1-50 engine 310 having four blocks 312, 314, 316 and 318. The image data in the form of image frames are input into block 1 312 which is fed into both block 2 314 and fed forward to a concatenation stage 324. The data from block 2 314 is sent to block 3 316 and up-sampled by two at block 322 and is fed forward into concatenation stage 324. Block 3 316 receives data from block 2 314 and sends data to block 4 318. The data output from block 4 318 is up-sampled by four in block 320 which is sent to concatenation stage 324. The output from the concatenations of blocks 1, 2 and 4 are utilized to construct feature map 326.

The currently used resource heavy model may be replaced with a model that is compatible with limited resources. To fuse image features at multiple scales, multiple layer outputs from the model, for example a ResNet-v1-50 model (block 1, block 2, block 4), are concatenated after up-sampling to capture both high level semantic information and low level spatial details.

In the proposed solution training batch norm parameters may be based on a large image dataset. In one example, training the pose estimation model utilizing a ResNet engine, the weights were pre-trained on a large image dataset utilized for initialization. In this example, the model was fine-tuned on a small image training dataset. The weights in the head structure were self-learned. Freezing the batch normalization parameters in ResNet by utilizing the batch normalization parameters trained on the large image dataset without fine-tuning during training, increased the model performance and outperformed current bottom-up models.

Figure 4:
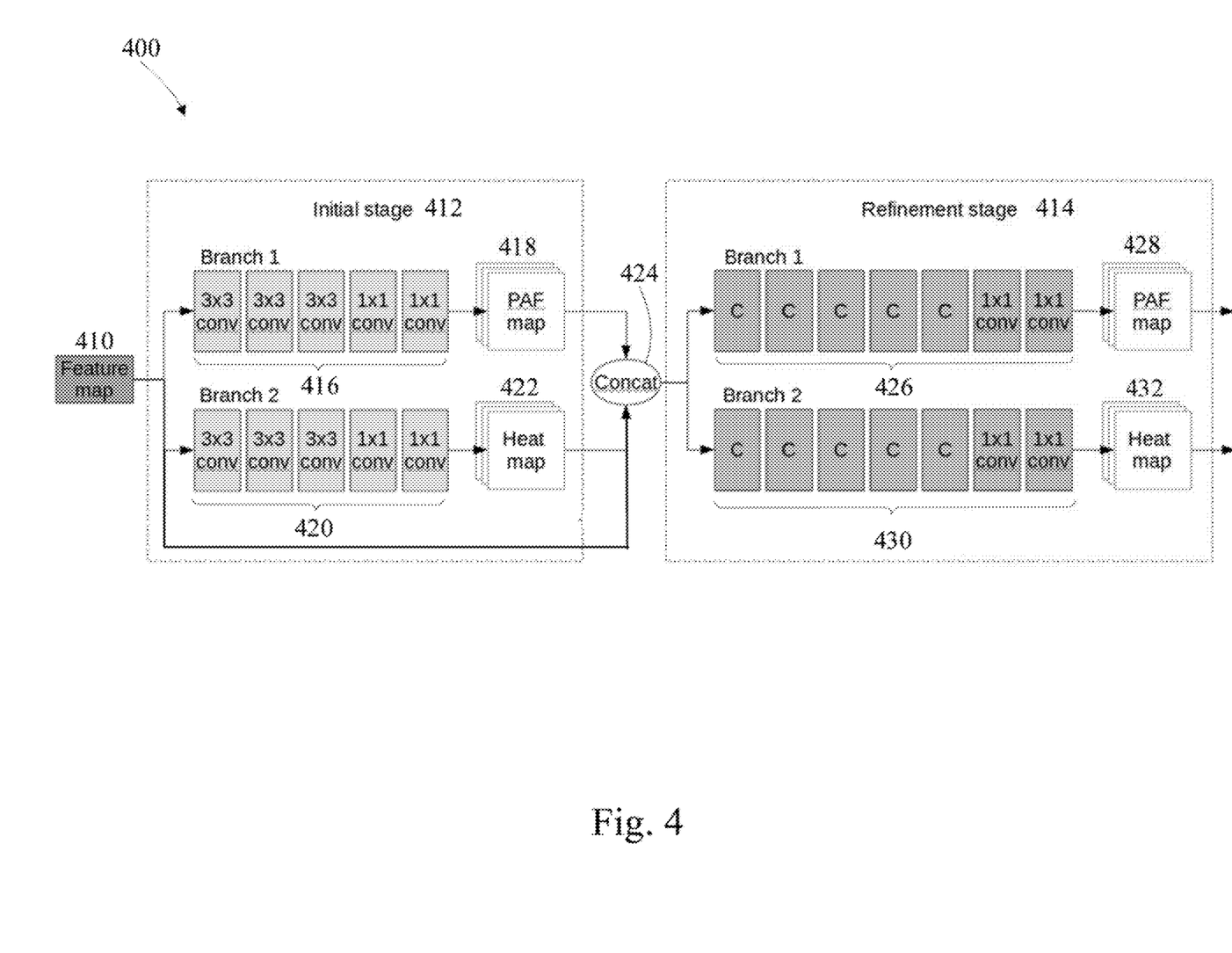
FIG. 4 is an example head net architecture in accordance with one embodiment of the disclosure.

FIG. 4 depicts an example having parallel prediction branches 400 including an initial stage 412 and a refinement stage 414.

In the initial stage 412, the feature map 410 is input into two parallel branches branch 1 416 and branch 2 420. Branch 1 416 is the part affinity field prediction branch and includes at least one 3×3 convolutional block and at least one lxi convolutional block yielding a part affinity field (PAF) map 418. Branch 2 420 is the heat map prediction branch and includes at least one 3×3 convolutional block and at least one 1×1 convolutional block yielding a heat map 422. A concatenation stage 424 receives the feature map 410, the PAF map 418 and the heat map 422.

In the refinement stage 414, the output of the concatenation stage 424 is input into two parallel branches branch 1 426 and branch 2 430. Branch 1 426 is the part affinity field prediction branch and includes at least one convolutional block C that includes of one 1×1 convolutional layer followed by two 3×3 convolutional layers and at least one final 1×1 convolutional stage yielding a part affinity field (PAF) map 428. Branch 2 430 is the heat map prediction branch and includes at least one convolutional block C that includes one 1×1 convolutional layer followed by two 3×3 convolutional layers and at least one final 1×1 convolutional stage yielding a heat map 432.

The head structure of one example model comprises at least two parallel prediction branches. One branch predicts the location of the body parts in the form of heat maps. The other branch predicts the association of body parts in the form of part affinity field (PAF) maps. As demonstrated in FIG. 4, the network has one initial stage followed by one refinement stage. The prediction of heat maps and PAF maps may be refined after a plurality of iterations, for example the utilization of multiple refinement stages, since the location of some body parts may provide contextual information for the location of other body parts. In one example one initial stage followed by one refinement stage may achieve an acceptable result with a reduction in resources by 80%.

In another example solution, a sequential structure was utilized. Since PAF contains implicitly body part location information, PAF refinement may be sufficient for accurate body part estimation. A body part confidence map (CM) refinement, that may also be termed the heat map, may be performed in one stage following PAF prediction. Therefore, this example utilizes the structure of two PAF initial stages and one PAF refinement stage followed by a confidence map prediction as shown in FIG. 5.

Figure 5:
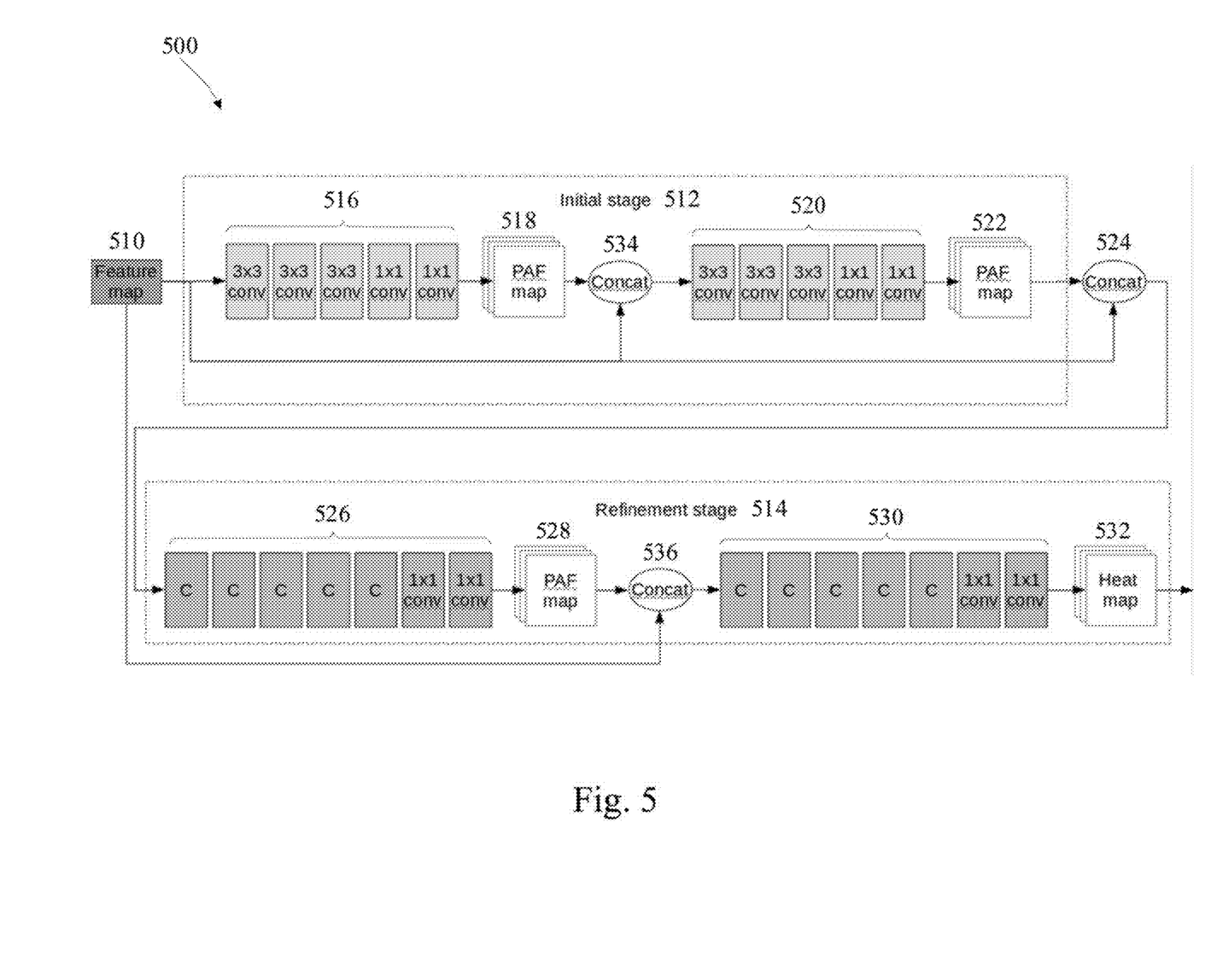
FIG. 5 is another example of a head net architecture in accordance with one embodiment of the disclosure.

FIG. 5 depicts an example having sequential prediction branches 500 including an initial stage 512 and a refinement stage 514.

In the initial stage 512, the feature map 510 is input into the first part affinity field prediction branch 516. The first part affinity field prediction branch 516 and includes at least one 3×3 convolutional block and at least one 1×1 convolutional block yielding a first PAF map 518. A first concatenation stage 534 receives the first PAF map 518 and the feature map 510 and outputs into a second part affinity field prediction branch 520. The second part affinity field prediction branch 520 includes at least one 3×3 convolutional block and at least one 1×1 convolutional block yielding a second PAF map 522. A second concatenation stage 524 receives the second PAF map 522 and the feature map 510 and outputs an initial result to the refinement stage 514.

In the refinement stage 514, the output of the second concatenation stage 524 is input into third part affinity field prediction branch 526. The third part affinity field prediction branch 526 includes at least one convolutional block C that includes of one 1×1 convolutional layer followed by two 3×3 convolutional layers and at least one final 1×1 convolutional layer yielding a third PAF map 528. A third concatenation stage 536 receives the third PAF map 528 and the feature map 510 and outputs into a heat map prediction branch 530, also termed a body part confidence map. The heat map prediction branch 530 includes at least one convolutional block C that includes of one 1×1 convolutional layer followed by two 3×3 convolutional layers and at least one final 1×1 convolutional layer yielding a heat map 532.

In current models, the convolutional unit C in the refinement stage performs a 7×7 convolution. The large receptive field may be utilized for the prediction of body parts to provide contextual information such as the spatial distribution of other body parts. In one example of the proposed solution, the convolutional structure includes at least one 1×1 convolutional layer followed by two 3×3 convolutional layers. The last 3×3 convolutional layer utilizes dilation by 2, which ensures the receptive field matches the current 7×7 convolution. The proposed solution has a structure that provides performance similar to the original model utilizing half the resources.

Figure 6:
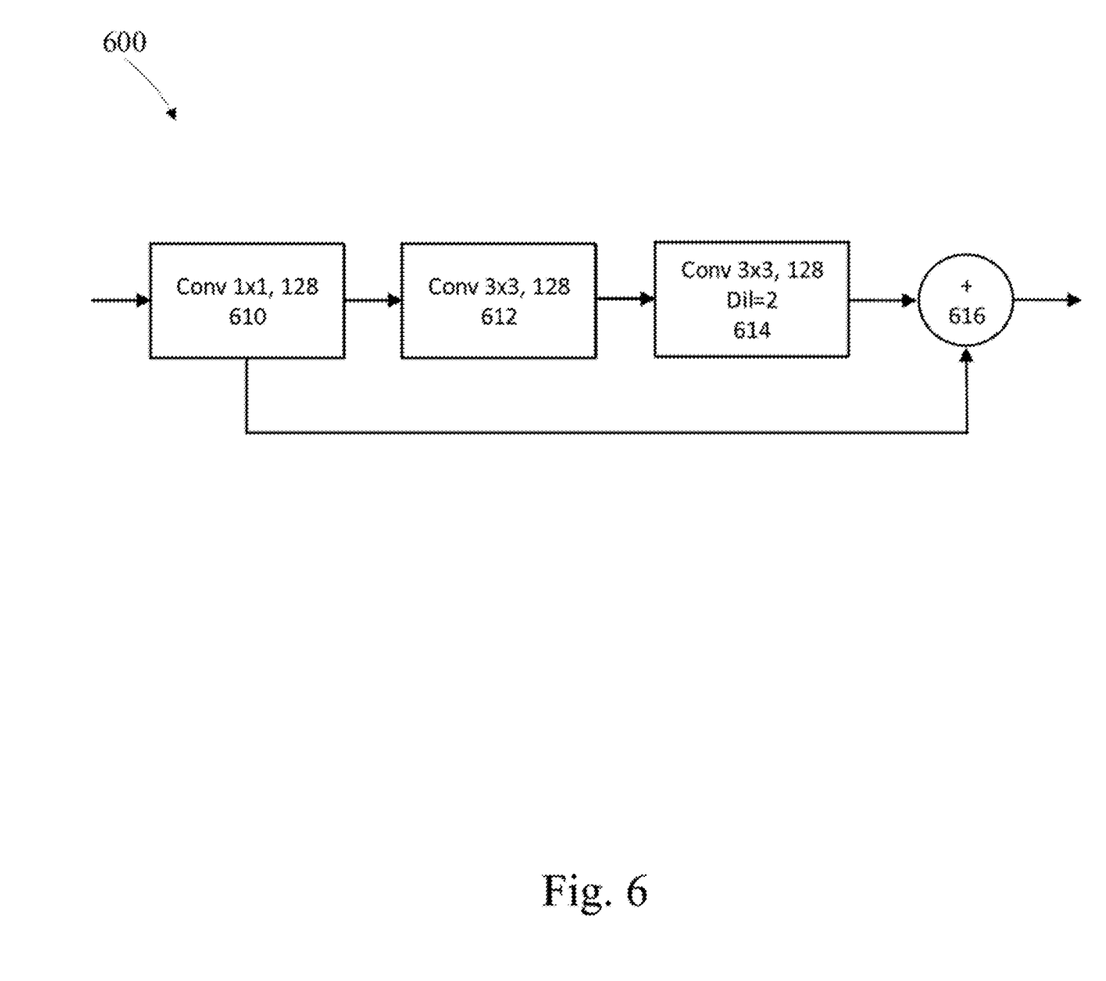
FIG. 6 is an example refinement stage replacement unit in accordance with one embodiment of the disclosure.

FIG. 6 depicts a reduced resource convolutional example 600. The current 7×7 convolution unit may be replaced by a convolutional 1×1 layer 610 that is fed by the input. The output of the convolutional 1×1 layer 610 having a channel number of 128 that is fed forward to a multiply accumulate layer 616. The first 3×3 convolutional layer 612 receives the output of the convolutional 1×1 layer 610 and sends the channel number 128 outputs to the second 3×3 convolutional layer 614 having a channel number of 128 and a dilation of two. The multiply accumulate layer 616 receives the output of the second 3×3 convolutional layer 614 and the output of the 1×1 convolutional layer 610.

The head structure of the proposed solution is made more compact by reducing the number of refinement stages to 1. In addition, a second example method utilizing a sequential structure of 3 PAF stages followed by 1 confidence map, i.e. heat map, stage may provide comparable performance to the first example method utilizing parallel two-branch structure. In the proposed solution, the current 7×7 convolution unit may be replaced by less resource dependent 3×3 convolutional structures having residual connections.

Figure 7:
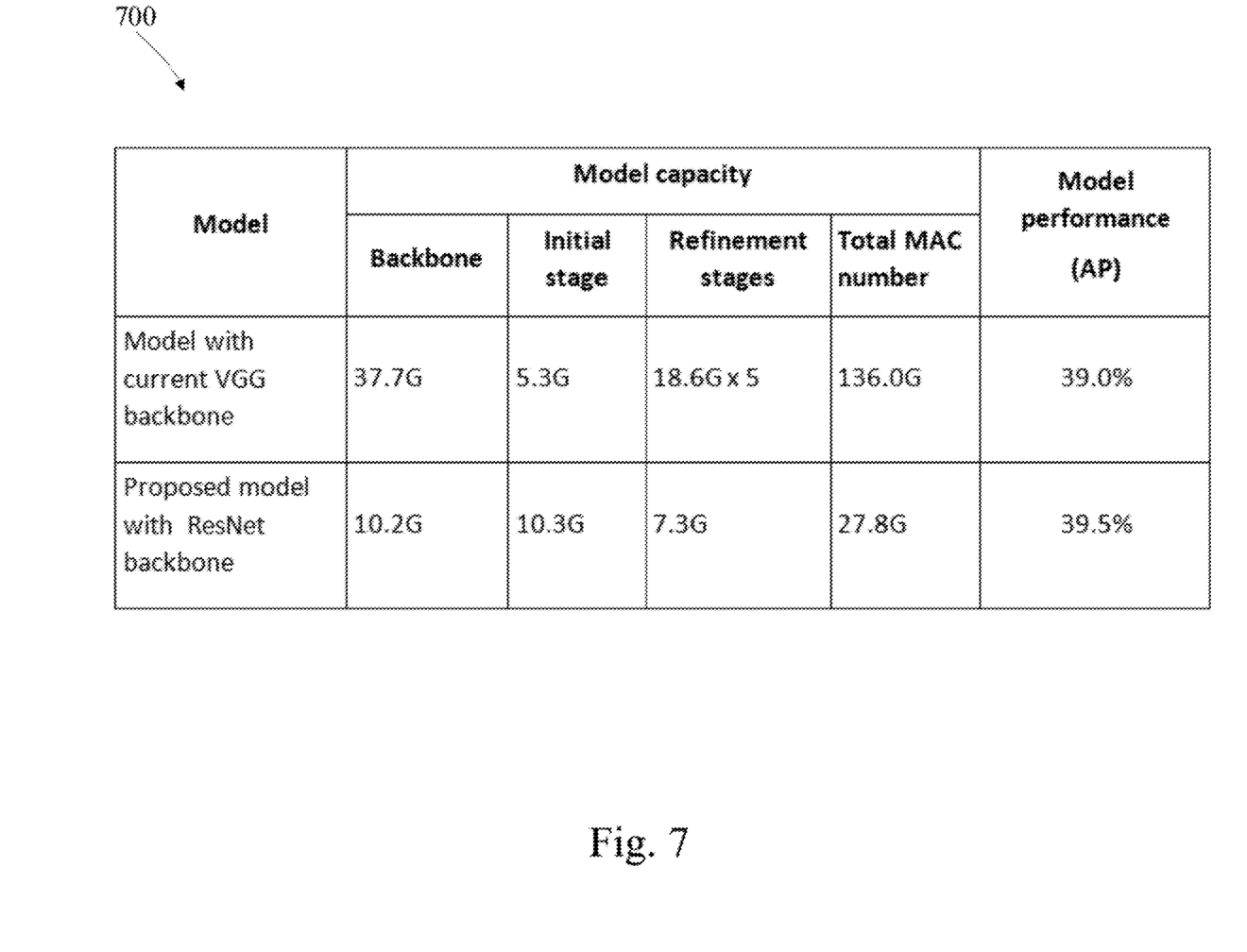
FIG. 7 is an example model result in accordance with one embodiment of the disclosure.

FIG. 7 depicts the results 700 of a current pose prediction based on a current resource heavy visual geometry group network (VGGNet) model and the proposed ResNet resource limited model. The results tend to indicate that reducing the model resources by 80% does not result in a loss of model performance over current models and may indicate a performance improvement.

Figure 8:
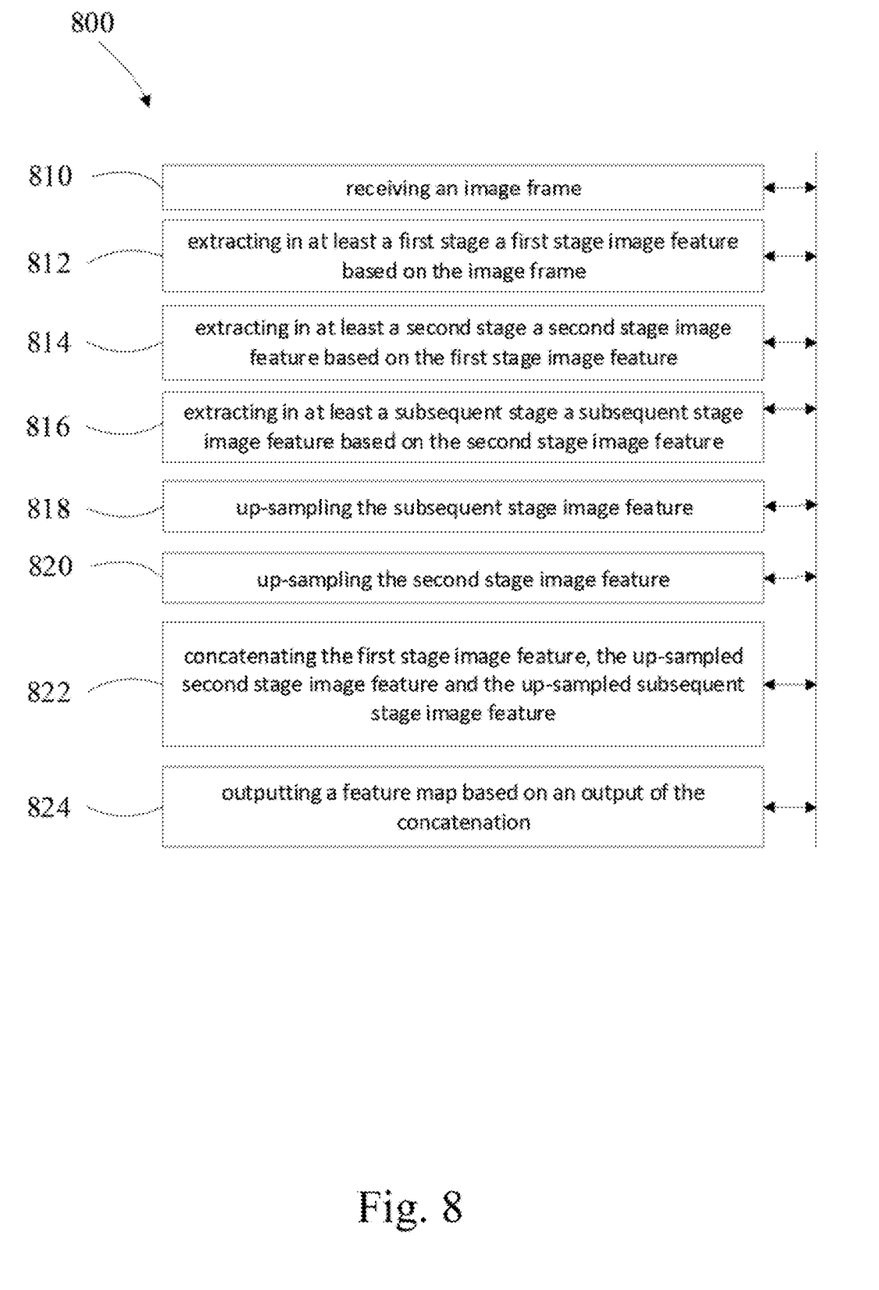
FIG. 8 is a first example method of human pose estimation backbone in accordance with one embodiment of the disclosure.

FIG. 8 depicts an example method of human pose estimation, including, receiving 810 an image frame, extracting 812 in at least a first stage a first stage image feature based on the image frame and extracting 814 in at least a second stage a second stage image feature based on the first stage image feature. The method also includes extracting 816 in at least a subsequent stage a subsequent stage image feature based on the second stage image feature, up-sampling 818 the subsequent stage image feature and up-sampling 820 the second stage image feature. The method also includes concatenating 822 the first stage image feature, the up-sampled second stage image feature and the up-sampled subsequent stage image feature and outputting 824 a feature map based on an output of the concatenation.

Figure 9:
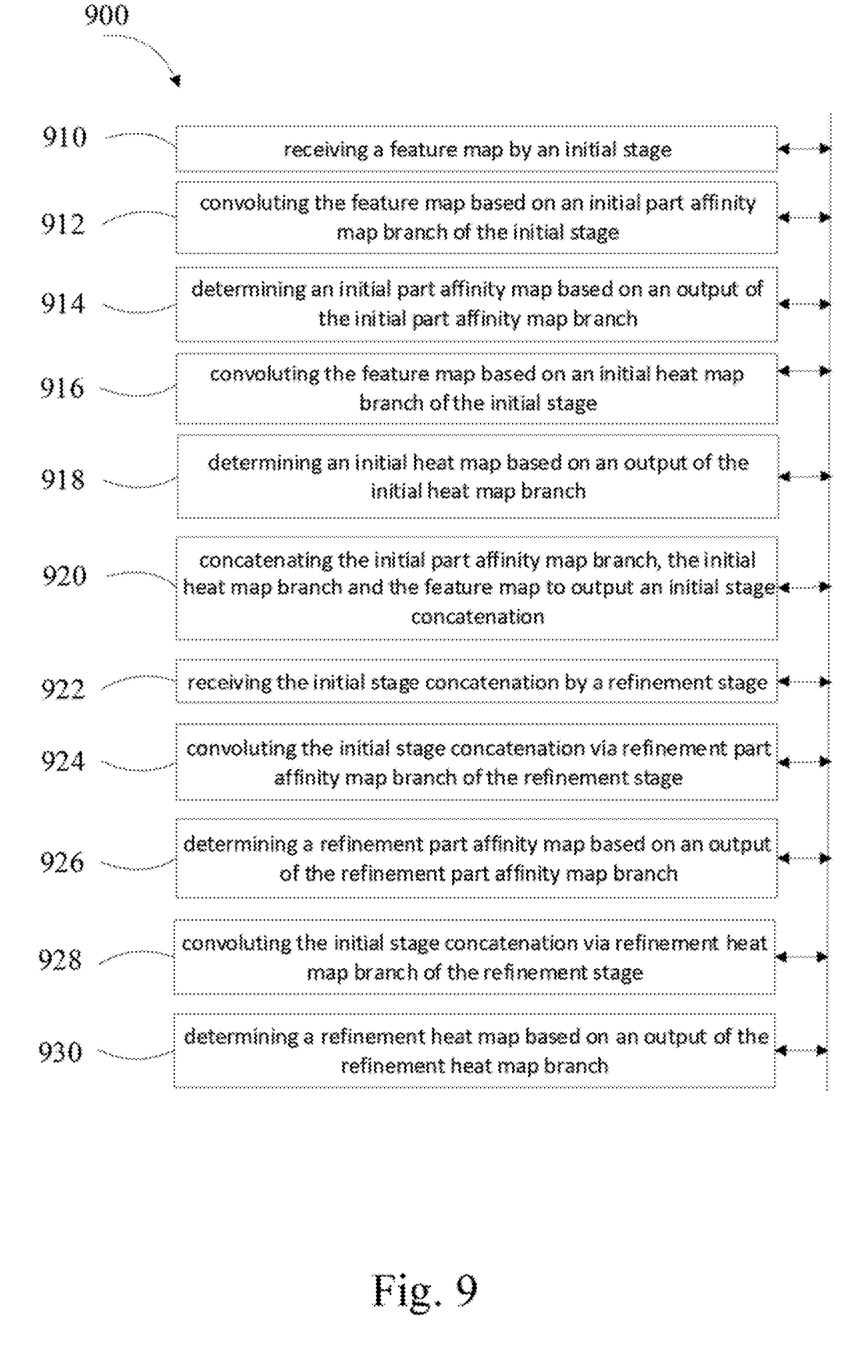
FIG. 9 is a second example method of human pose estimation in accordance with one embodiment of the disclosure.

FIG. 9 depicts an example method of human pose estimation, including, receiving 910 a feature map by an initial stage, convoluting 912 the feature map based on an initial part affinity map branch of the initial stage, determining 914 an initial part affinity map based on an output of the initial part affinity map branch and convoluting 916 the feature map based on an initial heat map branch of the initial stage. The method also includes determining 918 an initial heat map based on an output of the initial heat map branch, concatenating 920 the initial part affinity map branch, the initial heat map branch and the feature map to output an initial stage concatenation and receiving 922 the initial stage concatenation by a refinement stage. The method includes convoluting 924 the initial stage concatenation via refinement part affinity map branch of the refinement stage, determining 926 a refinement part affinity map based on an output of the refinement part affinity map branch, convoluting 928 the initial stage concatenation via refinement heat map branch of the refinement stage and determining 930 a refinement heat map based on an output of the refinement heat map branch.

Figure 10:
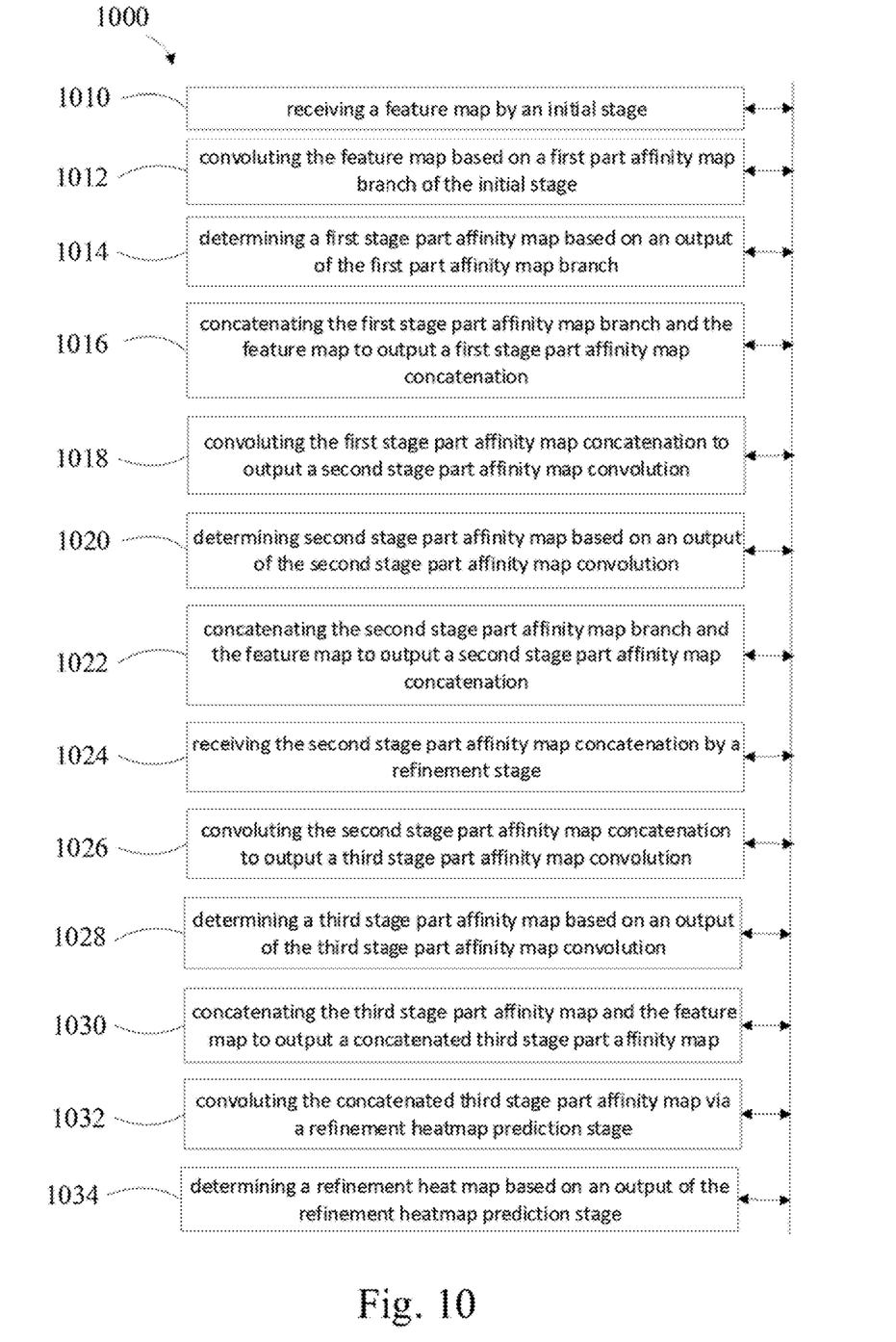
FIG. 10 is a third example method of human pose estimation in accordance with one embodiment of the disclosure.

FIG. 10 depicts an example method of human pose estimation, including, receiving 1010 a feature map by an initial stage, convoluting 1012 the feature map based on a first part affinity map branch of the initial stage, determining 1014 a first stage part affinity map based on an output of the first part affinity map branch and concatenating 1016 the first stage part affinity map branch and the feature map to output a first stage part affinity map concatenation. The method also includes convoluting 1018 the first stage part affinity map concatenation to output a second stage part affinity map convolution, determining 1020 second stage part affinity map based on an output of the second stage part affinity map convolution, concatenating 1022 the second stage part affinity map branch and the feature map to output a second stage part affinity map concatenation and receiving 1024 the second stage part affinity map concatenation by a refinement stage. The method includes convoluting 1026 the second stage part affinity map concatenation to output a third stage part affinity map convolution, determining 1028 a third stage part affinity map based on an output of the third stage part affinity map convolution, concatenating 1030 the third stage part affinity map and the feature map to output a concatenated third stage part affinity map, convoluting 1032 the concatenated third stage part affinity map to output a refinement heatmap prediction and determining 1034 a refinement heat map based on an output of the refinement heatmap prediction stage.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, to the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of human pose estimation, comprising:
   receiving an image frame containing at least one image feature wherein the image feature includes human body part locations;
   extracting via a neural network in at least an initial stage an initial stage image feature based on the image frame;
   extracting in at least a refinement stage a refinement stage image feature based on the first stage image feature;
   extracting in at least a subsequent stage a subsequent stage image feature based on the refinement stage image feature;
   up-sampling the subsequent stage image feature;
   up-sampling the refinement stage image feature;
   after the upsampling, concatenating the first stage image feature, the up-sampled second stage image feature and the up-sampled subsequent stage image feature;
   outputting a feature map based on an output of the concatenation; and
   determining a human pose estimation.

2. The method of human pose estimation of claim 1, wherein the feature map is based on a bottom-up determination.

3. The method of human pose estimation of claim 1, wherein the image frame is at least one of red-blue-green and infrared.

4. The method of human pose estimation of claim 1, wherein the extracting in at least the first stage utilizes a resnet-v1-50.

5. The method of human pose estimation of claim 1, wherein the up-sampling of the subsequent stage image feature is by four.

6. The method of human pose estimation of claim 1, wherein the up-sampling of the second stage image feature is by two.

7. The method of human pose estimation of claim 1, further comprising a third stage to extract a third stage image feature.

8. The method of human pose estimation of claim 7, wherein the feature map is based on a bottom-up determination.

9. The method of human pose estimation of claim 7, wherein the heat map predicts a location of a body part and the part affinity map predicts an association of the body part.

10. The method of human pose estimation of claim 7, wherein the convolution if the feature map utilizes a resnet-v1-50.

11. The method of human pose estimation of claim 7, further comprising determining a body part confidence map based on the refinement part affinity map.

12. The method of human pose estimation of claim 7, wherein the concatenating utilizes a residual connection of the feature map.

13. The method of human pose estimation of claim 7, wherein the convolution of the feature map includes at least one 3×3 convolution and at least one 1×1 convolution.

14. The method of human pose estimation of claim 13, wherein the feature map is based on a bottom-up determination.

15. The method of human pose estimation of claim 13, wherein the heat map predicts a location of a body part and the part affinity map predicts an association of the body part.

16. The method of human pose estimation of claim 13, wherein the convolution of the feature map utilizes a resnet-v1-50.

17. The method of human pose estimation of claim 13, further comprising determining a body part confidence map based on the refinement part affinity map.

18. The method of human pose estimation of claim 13, wherein the concatenating of the first stage, The second stage and the third stage utilities a residual connection of the feature map.

19. The method of human pose estimation of claim 13, wherein the convolution of the feature map includes at least one 3×3 convolution and at least one 1×1 convolution.

20. A method of human pose estimation, comprising:

receiving a feature map based on an image frame containing at least one image feature wherein the image feature includes human body part locations by an initial stage;

convoluting the feature map based on an initial part affinity map branch of the initial stage;

determining an initial part affinity map based on an output of the initial part affinity map branch;

convoluting the feature map based on an initial heat map branch of the initial stage;

determining an initial heat map based on an output of the initial heat map branch;

concatenating the initial part affinity map branch, the initial heat map branch and the feature map to output an initial stage concatenation;

receiving the initial stage concatenation by a refinement stage;

convoluting the initial stage concatenation via refinement part affinity map branch of the refinement stage;

determining a refinement part affinity map based on an output of the refinement part affinity map branch;

convoluting the initial stage concatenation via refinement heat map branch of the refinement stage;

determining a refinement heat map based on an output of the refinement heat map branch; and determining a human pose estimation.

21. A method of human pose estimation, comprising:

receiving a feature map based on an image frame containing human body parts by an initial stage;

convoluting the feature map based on a first part affinity map branch of the initial stage;

determining a first stage part affinity map based on an output of the first part affinity map branch;

concatenating the first stage part affinity map and the feature map to output a first stage part affinity map concatenation;

convoluting the first stage part affinity map concatenation to output a second stage part affinity map convolution;

determining second stage part affinity map based on an output of the second stage part affinity map convolution;

concatenating the second stage part affinity map and the feature map to output a second stage part affinity map concatenation;

receiving the second stage part affinity map concatenation by a refinement stage;

convoluting the second stage part affinity map concatenation to output a third stage part affinity map convolution;

determining a third stage part affinity map based on an output of the third stage part affinity map convolution;

concatenating the third stage part affinity map and the feature map to output a concatenated third stage part affinity map;

convoluting the concatenated third stage part affinity map to output a refinement heatmap prediction;

determining a refinement heat map based on an output of the refinement heatmap prediction; and determining a human pose estimation.

* * * * *